July 30, 1940.   H. E. WARREN   2,209,802
SYNCHRONIZED SPRING CLOCK
Filed Aug. 22, 1934
Fig. 1.
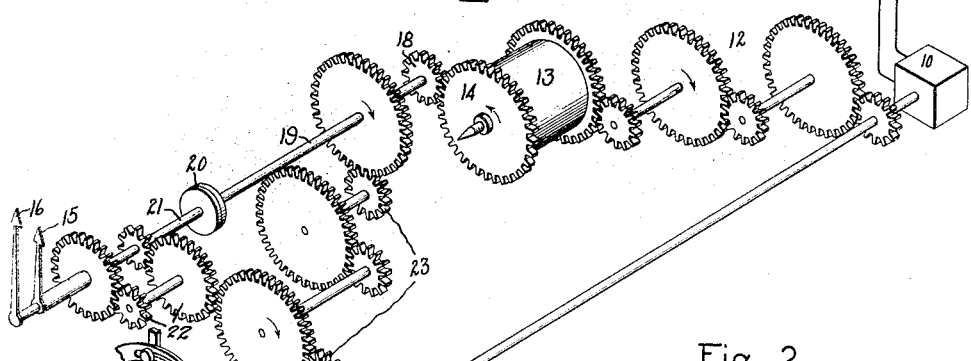
Fig. 2.
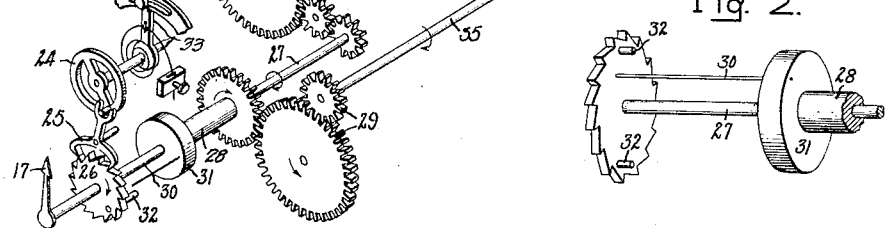
Fig. 3.
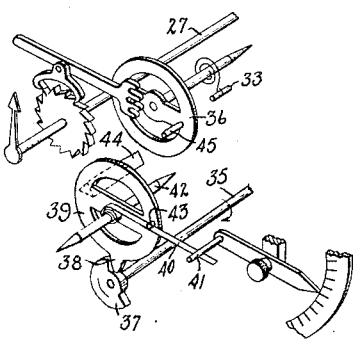
Fig. 4.  Fig. 5.
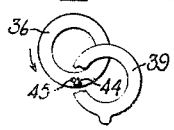 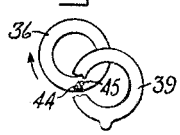
Inventor:
Henry E. Warren.
by Harry E. Dunham
His Attorney.

Patented July 30, 1940

2,209,802

UNITED STATES PATENT OFFICE 2,209,802

SYNCHRONIZED SPRING CLOCK

Henry E. Warren, Ashland, Mass., assignor to Warren Telechron Company, Ashland, Mass., a corporation of Maine Application August 22, 1934, Serial No. 740,962

1 Claim. (Cl. 58—26)

My invention relates to that form of clock mechanism which is driven by a spring and synchronized with the frequency rate of a regulated frequency alternating current circuit. In such a clock an escapement mechanism is depended upon during failures of the alternating current circuit to maintain the clock rate substantially correct and preferably the spring of the clock is wound by an electric motor energized from such alternating current circuit. According to the present invention, the clock spring is wound by a synchronous electric motor which is also used to mechanically cause the clock to run at the same rate when the synchronous motor is in operation. The present invention may be considered to be an improvement in certain respects over the form of clock described in my United States Letters Patent 1,564,803, December 8, 1925.

The features of my invention which are believed to be novel and patentable will be pointed out in the claim appended hereto. For a better understanding of my invention, reference is made in the following description to the accompanying drawing illustrating in Fig. 1 a perspective view of a spring driven clock mechanism, the spring of which is wound by a synchronous motor and which is provided with means for comparing the rates of the synchronous motor and spring driven clock and biasing the latter to run at the rate of the synchronous motor when the latter is in operation. Fig. 2 is a clearer view of a portion of the mechanism of the clock of Fig. 1. Fig. 3 illustrates a modified form of rate comparing and escapement controlling means that may be used in the form of clock shown in Fig. 1, and Figs. 4 and 5 illustrate different controlling conditions of the form shown in Fig. 3.

Referring now to Fig. 1, 10 represents a self-starting synchronous motor connected to a regulated frequency source of supply indicated at 11 such that this motor will be in synchronous operation except at such times as a failure may occur in the supply source. The motor is connected through a suitable gear train 12 to wind a clock spring contained within the barrel 13. The gearing will be so selected as to wind the spring at a slightly faster rate than the spring runs down and the winding arrangement will be of that type which allows slipping to occur when the spring is substantially fully wound to prevent over-winding of the spring or a slowing down of the synchronous motor. One such arrangement is described in my previous patent above referred to. The clock spring will have sufficient reserve to perform its function during such failures of the source of supply 11 as will ordinarily occur.

The driving end of the clock spring within the barrel 13 is connected to a gear 14 which in turn is geared to drive the timing device here represented as hour, minute and second hands 15, 16 and 17 of a clock. The minute hand 16 is driven through a gear 18, shaft 19, a friction clutch 20 to allow setting of the clock hands, and the shaft 21. The hour hand 15 is driven from shaft 21 through the usual back gears 22. The second hand is driven from shaft 19 through a suitable gear train 23. The rate of the spring driven timing mechanism is controlled by an escapement mechanism including a balance wheel 24, verge lever 25, and escape wheel 26, the latter being mounted on the second hand shaft 27. The escapement mechanism is of an inexpensive form such that, without the control to be described presently, it allows the clock to run slightly fast when the spring is fully wound and gradually decreases the clock rate as the spring runs down.

According to the present invention, the rate of the escapement clock is compared to the rate of the synchronous motor 10 when the latter is in operation and the synchronous motor has a timing rate which is as accurate as the regulation of the frequency of the source from which it is supplied which, as is generally known, is usually very accurate indeed. This rate comparing arrangement consists of a sleeve 28 on one of the shafts of the escapement clock, here the high speed second hand shaft 27, which sleeve is driven by the synchronous motor 10 through a gear train 29 and shaft 35 such that the sleeve 28 rotates in the same direction and at the same rate as such shaft 27 when the rate of the clock and of the synchronous motor are exactly correct.

This rate comparing arrangement further comprises a control device for the escapement clock which causes the latter to operate with the timing accuracy of the synchronous motor when the latter is in operation and which is so arranged and adjusted as to maintain the average timing accuracy of the escapement should the synchronous motor stop. This control as here represented consists of a fine wire spring finger 30 of circular cross section extending from the side of a disc 31 driven with sleeve 28 and one or more projections 32 extending from the side of escape wheel 26 into the path of movement of the outer end of spring finger 30. As more clearly shown in Fig. 2, the projection or projections 32 have their contacting surfaces so shaped and the spring finger is sufficiently flexible that should the synchronous motor and spring finger 30 stop due to a failure of the source of supply 11 while the escapement clock is in normal operation, the finger 30 will be merely flexed to one side when a projection 32 comes in contact therewith and the projection 32 will slip past the spring finger with only a momentary reduction in the driving power delivered to the escapement by the clock spring at 13. This momentary reduction in spring pressure has only a slight effect upon the rate of the clock which can of course be controlled by the regulator 33 so that it will have the average accuracy of such movements when the synchronous motor is stopped.

When the synchronous motor is running, however, if there is any difference in rate between the escapement and the synchronizing finger 30 the spring finger will be brought and held steadily against either one side or the other of the projection 32 on the escape wheel so as to continuously increase or decrease the driving power delivered by the clock spring 13 to the escapement. This increase or decrease in power received by the escapement will automatically be held at the average point where the rate of the clock corresponds exactly with the rate of the synchronizing sleeve 28 driven or restrained to run at a definite speed by the synchronous motor 10.

If this synchronizing operation occurs at a time when spring 13 is nearly run down and the escapement clock tends to run slow the synchronous motor will contribute sufficient additional power to cause the escapement to run at the rate of the synchronizing device. If on the other hand, when the spring 13 is substantially fully wound and the tendency of the escapement clock is to run fast, the synchronizing device will reduce the power supplied to the escapement by an amount to cause it to run at the synchronous rate. The invention thus requires a form of escapement which has a rate dependent to some extent upon the power supplied thereto which requirement is fulfilled by an escapement of an inexpensive form. This is true generally of the recoil forms of escapements such as is represented, as distinguished from the dead beat form.

The reason why the projection 32 of the control device will slip past the spring finger 30 when the synchronous motor is stopped and these parts will have the controlling action described when the synchronous motor is running may be explained by the fact that in the latter case the two parts are moving at approximately the same average rate of speed and notwithstanding that the escapement has an irregular forward movement, the shock of contact and the controlling forces involved are very much less and more gradually applied than when these parts come together more abruptly when the synchronous motor is stopped. The average force which is continuously conveyed through the spring finger during regulation is only a small fraction of the force capable of being supplied by the clock spring 13 and is of course less than that more abruptly applied when the synchronous motor is stopped and the controlling parts 30 and 32 slip past each other. The shape of the projection 32 is such that the parts will slip past each other when the force exceeds that required for regulating purposes.

It will be understood that while in Fig. 1 the single projection 32 is illustrated as being on the escape wheel 26, I may place two or more such control parts on one of the more slowly moving parts of clock train and in Fig. 2 there is represented a plurality of such control projections 32 assumed to be on any desired rotating part of the spring driven clock train.

Fig. 3 represents another modification of the invention consisting of a synchronously motor driven control device operating upon the balance wheel of a clock escapement although parts which will be similar to those of Fig. 1 have been omitted. In this modification 27 represents the shaft on which the escapement wheel 26 is mounted and will be driven from the clock spring as in Fig. 1. Except for pin 45, this is a standard escapement device and is shown in Fig. 3 in the center of its oscillating range. 35 represents the shaft driven from the synchronous motor which winds the clock spring. This shaft 35 is driven at a rate corresponding to the oscillations of the balance wheel 36 or some multiple thereof and drives a cam 37 in a clockwise direction as here represented. Resting against the forward face of the high part of cam 37 is a cam follower 38 projecting from a synchronizing balance wheel 39. The last mentioned balance wheel is oscillated through a small arc by and at a rate determined by the synchronous motor and the escapement balance wheel 36 is of course oscillated with and at a rate determined by the clock. When both rates are correct, there is no regulating action but otherwise there occurs more or less intermittent interference between a synchronizing tooth 44 on balance wheel 39 and a pin 45 on the escapement balance wheel which forces the latter to operate at the rate determined by the synchronous motor which is normally correct.

A synchronizing balance wheel which has been found to operate satisfactorily may be constructed as follows: A very light spring wire 40 is secured to the synchronizing balance wheel 39 and extends radially therefrom and has its outer end resting against a stationary but adjustable pin 41 and tends to hold the cam follower 38 against the forward face of the high part of cam 37. Cam follower 38 clears the low part of cam 37 and in no case does it oscillate in a clockwise direction far enough to prevent contact with the forward face of cam 37 as the latter approaches contacting position. One end of the spring 40 is fastened to the shaft 42 of this balance wheel and a portion of this wire may be coiled about the shaft itself to secure increased flexibility and uniform spring pressure. An initial tension of the spring is provided by having it rest against a pin 43 in the rim of this balance wheel. The spring will flex away from pin 43 at the counterclockwise extremity of the oscillation of the wheel 39. The balance wheel itself has its center of gravity at the left of its pivot and this may be provided by the synchronizing tooth 44 which projects from the rear side of the synchronizing balance wheel and cooperates with the pin 45 extending from the forward face of the escapement balance wheel 36. The balance wheel 39 is represented in approximately its position of rest at which time the synchronizing tooth 44 is just below and out of the path of oscillation of pin 45 on the escapement balance wheel. It will be observed therefore that when the synchronous motor is at rest with the cam 37 in the position shown or in any other position, tooth 44 will be out of the path of oscillation of pin 45 and there will be no interference whatever with the normal operation of the clock escapement under these conditions.

When the synchronous motor driven cam 37 is rotating at its proper speed in a clockwise direction and starting with the parts in the position shown, the operation of the synchronous balance wheel may be described as follows: Wheel 39 is first forced to rotate in a counterclockwise direction storing energy in spring 40. It reaches the extremity of its swing in this direction and returns only after the high part of cam 37 has passed the cam follower 38. As soon however as cam 37 has completed a portion of a revolution so as to bring its low or cutaway portion opposite wheel 39, the cam follower 38 is freed and returns toward the position shown under the action of spring 40. The momentum of the wheel 39 resulting from the release of energy in spring 40 carries the wheel 39 slightly further in a clockwise direction lifting weight 44 which brings the wheel to a stop in approximately the position shown in Fig. 4 at the same time storing energy for a return movement which starts immediately. Shortly thereafter the leading shoulder in cam 37 catches the cam follower and the cam is given a second impulse to the right, thus completing the cycle. In the apparatus shown, cam 37 makes a complete rotation for a complete oscillation of the synchronizing balance wheel 39 and the parts will be proportioned and adjusted to satisfactorily accomplish this result.

As the part 38 of balance wheel 39 swings to the left of the position shown in Fig. 3, synchronizing tooth 44 thereon is swung upward and is momentarily well into the path of oscillation of pin 45 on the clock escapement balance wheel 36 as shown in Figs. 4 and 5. It is required that when the rates of the two balance wheels are correct, the two oscillate in a synchronous relation either at the same frequency or wheel 36 may oscillate at a frequency which is a multiple of the frequency of oscillation of wheel 39. Under these conditions and although tooth 44 and pin 45 may occupy the same position during their oscillations they do not necessarily do so at the same instant and it is only when these parts are in such a phase relation with respect to each other that they collide is there any interference. When such interference occurs, regulation of the clock escapement takes place and it is forced to operate at an average rate which is synchronous with the motor which drives cam 37. In Fig. 3, the balance wheel 36 is shown in the center of its oscillation range and the wheel 39 in its position of rest with tooth 44 below and out of the path of movement of pin 45. Let us assume that the two balance wheels are oscillating in such phase relation that there is no interference. If now these parts are not oscillating in a synchronous relation, then their relative phase positions will change and there will come a time when the pin 45 will collide with the synchronizing tooth 44. With the parts arranged as illustrated, this collision must occur when the balance wheel 36 is not in the center of its vibration and the effect of the collision will be either to retard or accelerate the rate of the clock operated balance wheel depending upon whether the collision occurs as this balance wheel is moving towards its central position or away therefrom. Also the effect of the collision will assist gravity in throwing the synchronizing balance wheel 39 back toward its central position as the contacting surfaces of the synchronizing tooth are bevelled to accomplish this result and prevent locking action. The phase of the balance wheel 36 will be shifted slightly by any such collision.

The normal synchronizing action may be explained as follows:

First, assume that the balance wheel 36 is running fast and that its phase relation to the synchronizing balance wheel 39 is such that the stroke of pin 45 in a counterclockwise direction has been completed and it is moving back towards its central position when it strikes the tooth 44 as represented in Fig. 4. This collision will tend to retard the phase of balance wheel 36. Consequently, on the next synchronizing oscillation collision may not occur, or it may occur with less force. On some following synchronizing oscillation there may again be a similar collision. The frequency and violence of these collisions will depend upon the error in the rate of 36, but there will be a tendency to gradually acquire a balance between the violence of the collisions and error in rate so as to maintain substantially uniform correcting action and consequently uniform phase relation between the balance wheels.

Second, if wheel 36 is running slow there will come a time when a collision will take place when the pin 45 is on its outward stroke as represented in Fig. 5. The effect of this collision will be to somewhat shorten the travel of the balance wheel 36. This will have the effect of speeding up the balance wheel 36 so that on the next synchronizing oscillation it may have passed by the tooth 44. If it has not done so it will receive still further accelerating impulses which will tend to bring about sufficient phase shift to miss contact. A slowing down of balance wheel 36 will again cause speeding up correcting collisions to occur as represented in Fig. 5. In this speeding up process should a collision occur on the left hand slope of the synchronizing tooth as represented in Fig. 4 but with the pin 45 moving on its outward swing the balance wheel 36 will be slowed down so that the next collision will again occur as in Fig. 5.

Thus it will be seen that the normal action of this synchronizing mechanism is to bring about repeated contacts between pin 45 and the left hand slope of tooth 44 when the rate of the clock balance wheel 36 is fast, with a tendency of stability of the phase relation between the two balance wheels. When the balance wheel 36 has a slow rate there is a tendency of instability of the phase relation between the two balance wheels, the regulation being effected by alternate contacts between pin 45 and the right and left hand slopes of tooth 44. In both cases, however, the synchronous relationship between the two balance wheels may be maintained if their rates are not greatly different.

I have found that with a commercial clock movement equipped with this synchronizing mechanism synchronizing of the regular clock balance wheel may be easily maintained provided the error in the rate of the spring clock movement is not otherwise greater than about fifteen minutes per day. The position of pin 41 is preferably adjustable and by its adjustment the extent to which tooth 44 swings into the path of pin 45 may be controlled to obtain the most satisfactory operation.

The form of electrically synchronized clock movements described are desirable since they utilize standard clock constructions for a large portion of the mechanism. They provide correction of the spring clock when the synchronous motor is running whether the spring clock is normally fast or normally slow. In the arrangement of Fig. 3 there is no interference with the operation of the spring clock when the synchronous motor stops and with the arrangement of Fig. 1 such interference as exists under these conditions is not harmful.

In both modifications the rate of the spring clock is compared to that of the synchronous motor when the latter is in operation. There is no interference with the spring driven clock if its rate is correct. However, if its rate is incorrect in either direction as compared to the synchronous motor, correction is applied in the proper direction and to the extent necessary to cause the spring clock to operate correctly.

What I claim as new and desire to secure by Letters Patent of the United States, is:

A timing device, a main spring for operating said device, a recoil form of escapement driven by said spring for controlling the rate of said device, a synchronous motor associated with said device, means for comparing the rate of said device with the rate of said synchronous motor comprising rotating parts having the same axis of rotation and driven respectively by said device and motor in the same direction and at the same rates of speed when the device is operating at the correct rate as compared to that of the synchronous motor, one of said parts being resilient and projecting into the path of movement of the other part, whereby, when the rate of said device is slow or fast as compared to that of the motor, energy is conveyed between said parts by an amount and in a direction to correct the rate of said device, said parts being so arranged that, should the part driven by the synchronous motor stop, the parts will pass without stopping the operation of the timing device.

HENRY E. WARREN.